Figure 2:
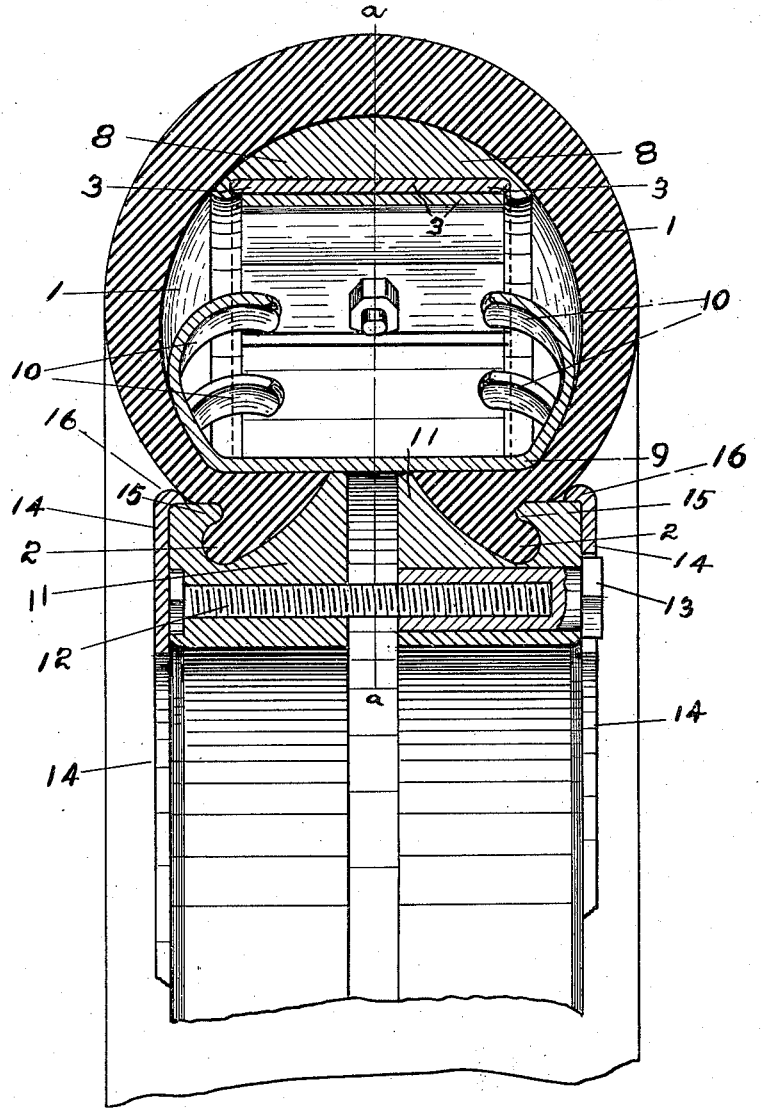

J. T. CLARK.
RESILIENT VEHICLE TIRE.
APPLICATION FILED NOV. 8, 1911.
1,072,699.
Patented Sept. 9, 1913.
2 SHEETS—SHEET 1.
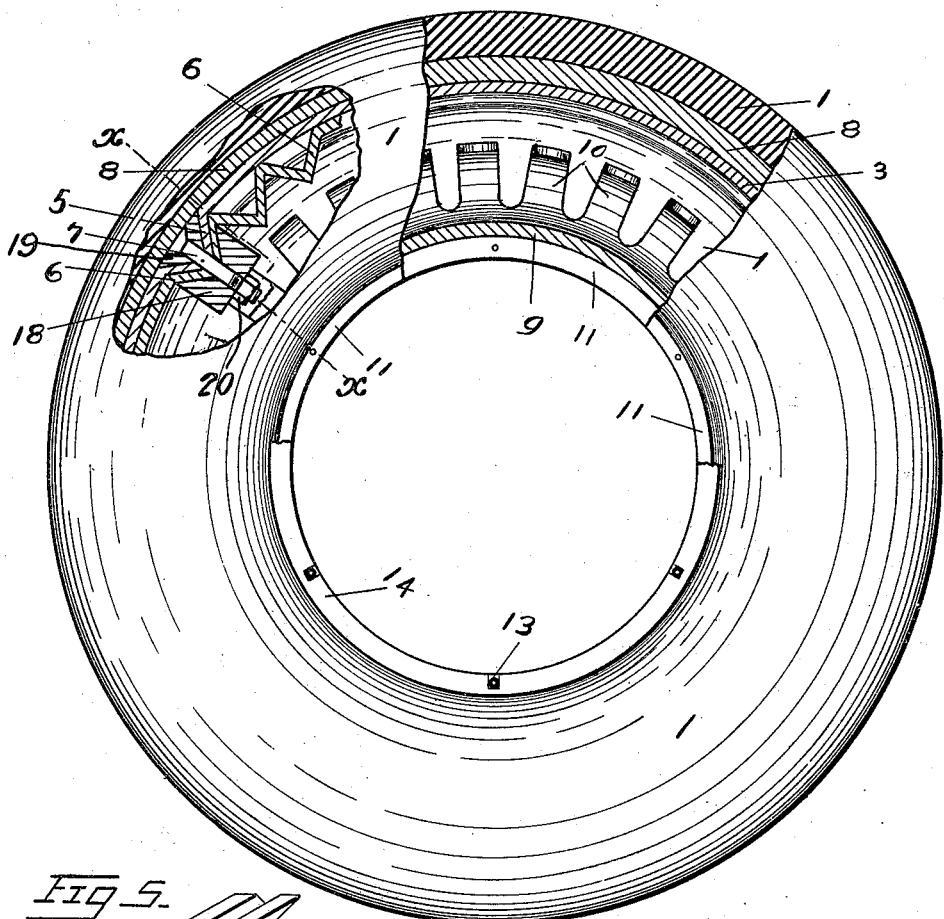
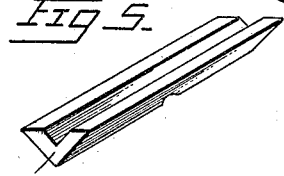
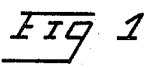
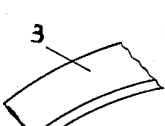
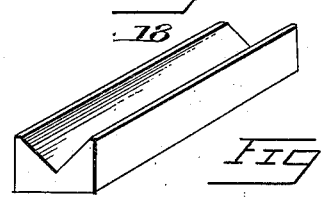
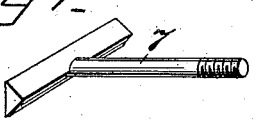
WITNESSES
F. L. Horspool
Sam Raney
John T. Clark
INVENTOR
By J. M. Thomas
ATTORNEY

J. T. CLARK.
RESILIENT VEHICLE TIRE.
APPLICATION FILED NOV. 8, 1911.

1,072,699.

Patented Sept. 9, 1913.
2 SHEETS—SHEET 2.

WITNESSES
F. L. Horspool
Sam Raney

John T. Clark
INVENTOR
By J. M. Thomas
ATTORNEY

UNITED STATES PATENT OFFICE.

JOHN T. CLARK, OF PROVO, UTAH.

RESILIENT VEHICLE-TIRE.

1,072,699.  Specification of Letters Patent.  Patented Sept. 9, 1913.

Application filed November 8, 1911. Serial No. 659,161.

*To all whom it may concern:*

Be it known that I, JOHN T. CLARK, a citizen of the United States, residing at Provo, in the county of Utah and State of Utah, have invented certain new and useful Improvements in Resilient Vehicle-Tires, of which the following is a specification.

The object of my invention is to provide a resilient vehicle tire in which the spring effect is given to the wheel without the pneumatic principle being used, and to provide a vehicle tire which may be used on a majority of the wheels now constructed, such as automobile wheels built to receive a pneumatic rubber tire, whereon my tire may be used with but slight changes in the rim of the wheel.

The invention consists in the novel construction and combination of parts hereinafter described, and illustrated in the accompanying drawings, forming a part of this application, in which drawings similar letters of reference indicate like parts throughout the several figures, it being understood that slight changes in the manner of securing the tread member on the spring, may be resorted to within the scope of the claims, without departing from the spirit of the invention or sacrificing any of its advantages.

In the drawings Figure 1 is a side elevation of one of my tires, parts cut away on line *a a* Fig. 2. Fig. 2 is a radial cross section on line *x—x* of Fig. 1. Fig. 3 is an isometric section of the outer spring band. Fig. 4 is an isometric section of the inner band. Fig. 5 is a view in perspective of one of the V-shaped washers. Fig. 6 is a similar view of the other washer and Fig. 7 is a view in perspective of one of the bolts.

It is my purpose to use an outer tire casing 1 similar to that now used on some automobiles and other vehicles. On each edge of said tire casing is integrally formed a clamping lug 2. Within said tire casing 1 and adjacent the inner annular periphery is concentrically placed a guard tire 8, made of leather or other flexible material. Concentrically within and adjacent the inner side of said guard tire is contiguously placed the adjustable spring band 3. This spring band 3 is made adjustable in order that it may be readily placed within said tire casing 1, and may be adjusted to conform to the inner diameter of the tire casing of different sized wheels. The plan of securing and of adjustment shown is a transverse V-shaped crimp 5 in one end of said spring and a plurality of similar crimps 6 at the other end of said spring. When said spring is circumferentially extended until it concentrically contacts with the inner side of said guard tire a washer 19, triangular in cross section, is placed within said crimp 5, and another washer 18 having a V-shaped longitudinal slot therein is placed over one of said crimps 6 adjacent. Then by means of the threaded bolt 7 and nut 20, the spring is formed into the band 3. The edges of said band are rounded off to prevent injury to the said guard tire 8. Within said spring band 3 and concentrically spaced therefrom is the inner band 9 having each edge flanged outwardly. Said outwardly turned flanges have portions thereof cut out and the uncut portions curved toward the uncut portions of the other edge flange, forming finger-like springs 10, on each edge of said inner band 9. The purpose being to support the sides of said tire casing 1 on the inside, against lateral movement when the wheel tends to skid as in turning a street corner rapidly, also to aid the said outer spring band 3 when subjected to sudden or extra compression. Two annular gripping bands 11 are fitted within said inner band 9, one adjacent each edge thereof, and each of said gripping bands 11 has a flange 15 thereon to engage the said clamping lug 2 of the tire casing 1. The said gripping bands 11 are held in contact with said tire casing 1 by the threaded bolts 12 and their respective cap nuts 13. Covering the head of said bolts 12 on one side of the tire and around the said nuts 13 on the other side respectively are placed the annular plates 14, each of which has a flange 16 thereon that incloses the peripheric edge of its adjacent band 11. The said annular plates are held in place and the tire on the felly of the wheel by means of clamping bolts not shown, as the bolts used on the various makes of wheels differ.

Where the pneumatic principle is used, the tension on the outer tire is determined and regulated by the inflation of the inner tube, and the pressure is outward. In my tire the tension on the outer tire or tire casing 1 is determined and regulated by the bolts 12 and their nuts 13, and the pressure is radially inward on the band 3 and radially outward on the band 9. The extreme or ultimate tension is determined by the strength of the material in the tread member 1, the inward or crushing strength of the band 3, or the outward or tensile strength of the band 9. The resiliency of my tire is regulated by the tensile stress on the tire casing 1.

Having thus described my tire I desire to secure by Letters Patent and claim:—

1. A vehicle tire consisting of a strip of spring metal having a V-shaped transverse crimp in one end portion and a plurality of similar crimps in the other end portion; a washer formed to fit within said crimps and one to fit over said crimps; means to hold said washers in gripping contact with said metal strip to form it into a spring band; a flexible guard band contiguously placed on the peripheral face of said spring band; a floating metal band of less diameter than said spring band concentrically placed therein; supporting spring members integrally formed on and outwardly extended from the edges of said metal band; and means to inclose said guard band and said spring band and said metal band and tending to draw said spring band radially inward and said metal band radially outward, said means consisting of an outer flexible casing and tensioning devices to draw the edges of said casing toward each other within said metal band.

2. A vehicle tire consisting of a metal spring having holes and V-shaped crimps in each end portion thereof; a washer formed to fit within and one to fit without said crimps; and means to draw said washers in gripping contact with said metal spring when the end portions have been placed adjoining each other to form a spring band, said means consisting of a bolt and nut secured thereon, a floating metal band of less diameter and concentrically placed within said spring band; a flexible outer casing; and means to draw the edges of said casing toward each other within said metal band.

In testimony whereof I have affixed my signature in presence of two witnesses.

JOHN T. CLARK.

Witnesses:
F. L. HORSPOOL,
SAM RANEY.